(12) United States Patent
Koolhiran

(10) Patent No.: US 7,703,863 B2
(45) Date of Patent: Apr. 27, 2010

(54) TRACK SHOE ASSEMBLY FOR TRACKED VEHICLE

(75) Inventor: Hiran Koolhiran, Bangkok (TH)

(73) Assignee: Chaiseri Metal & Rubber Co., Ltd., Pathumthani (TH)

( * ) Notice: Subject to any disclaimer, the term of this patent is extended or adjusted under 35 U.S.C. 154(b) by 300 days.

(21) Appl. No.: 11/760,166

(22) Filed: Jun. 8, 2007

(65) Prior Publication Data

US 2007/0284940 A1 Dec. 13, 2007

(30) Foreign Application Priority Data

Jun. 9, 2006  (EP) .................................. 06450079
Jun. 4, 2007  (EP) .................................. 07450099

(51) Int. Cl.
*B62D 55/28* (2006.01)
*B60B 15/00* (2006.01)
*F16H 7/06* (2006.01)

(52) U.S. Cl. ...................... 305/189; 305/160; 305/200

(58) Field of Classification Search ......... 305/159–164, 305/51, 187–191, 196–198, 200–201
See application file for complete search history.

(56) References Cited

U.S. PATENT DOCUMENTS

| | | | |
|---|---|---|---|
| 2,332,976 A | 10/1943 | Saurer et al. | |
| 2,353,124 A | 7/1944 | Burgess | |
| 2,375,170 A | 5/1945 | McNeil | |
| 3,357,750 A * | 12/1967 | Reynolds et al. | ............ 305/189 |
| 3,721,476 A * | 3/1973 | Andersson | .................. 305/162 |
| 4,262,972 A | 4/1981 | Falk | |
| 4,765,694 A | 8/1988 | Cory | |
| 4,765,695 A | 8/1988 | Cory | |
| 4,840,438 A | 6/1989 | Cory | |
| 4,871,216 A | 10/1989 | Cory | |
| 5,069,510 A | 12/1991 | Cory | |

FOREIGN PATENT DOCUMENTS

GB    2089747 A  *  6/1982

\* cited by examiner

*Primary Examiner*—Jason R Bellinger
(74) *Attorney, Agent, or Firm*—Steven L. Nichols

(57) ABSTRACT

Track shoe assembly for a tracked vehicle, comprising a) a track shoe member with a chassis assembly having a pair of tubular housings (80) connected by a spaced web-portion, b) a replaceable rubber pad (9) with a curved sheet metal (13) having rims to hold the rubber pad rigidly and precisely in position, and c) an end connector (26) having a pair of bush holes (267) which accept an end of a track shoe pin (60) extending through a tubular housing, thus connecting adjacent track shoe members at either side in a pivotally flexible track. The chassis (9) also has a guide member (91) which is located on one a sleeve holding a housing and has a shape tapering towards its top end.

9 Claims, 17 Drawing Sheets

TRACK SHOE ASSEMBLY FOR TRACKED VEHICLE

RELATED APPLICATIONS

This application claims the benefit under 35 U.S.C. §119 (d) of European Patent Application No. 06450079.6, filed Jun. 9, 2006 titled "Track Shoe Assembly for Tracked Vehicle," and European Patent Application No. 07450099.2, filed Jun. 4, 2007 titled "Track Shoe Assembly for Tracked Vehicle," which applications are incorporated herein by reference in their entireties.

BACKGROUND

Tracked vehicles such as armored personnel carrier vehicles (APC) and light/medium armor track vehicles have long been used in military exercise maneuvering and even warfare scenarios. Various aspects of development of these vehicles have been attempted so as to improve their efficiency.

Development of track shoes for these types of vehicles has also been attempted so as to improve mobility of the vehicle, reduce maintenance costs, etc.

The track shoe consists of small parts, for example a shoe body, rubber pad, end connector, etc. According to an inventor's study, the service life of each of these parts is different. They are categorized into short-term, middle-term and long-term service life. Parts with short-term service life are generally rubber parts such as the rubber pad. Parts with medium-term and long-term service life are metal parts such as the connector and metal shoe body. In the short-term category, the life cycle of the parts is extremely short. In order to realize that the short-term life cycle of the rubber pad compares with the long-term category, the life cycle of the metal shoe is not cost effective for production; rather it has to be replaced on the metal shoe body even if it is still in good condition because the rubber bushing is worn out.

Generally, conventional track shoes are divided into two types. The first type is a whole-metal shoe body type which is widely used in the United States, Russian, European countries as shown in U.S. Pat. No. 2,332,976 (Saurer et al.), U.S. Pat. No. 3,357,750 (Reynold et al.), U.S. Pat. No. 2,353,124 (Burgress) and U.S. Pat. No. 4,262,972 (Falk). Their advantages are a replaceable rubber pad and long service life of the metal shoe body. The replaceable rubber pad provides long service life by replacing the rubber pad whenever the rubber wears out. However, there are many disadvantages such as high weight, shortened short-term service life of the rubber pad, less stability and more vibration during vehicle motion. Moreover, the whole-metal shoe body requires a grouser to hold the rubber pad. The grouser limits the life-span of the rubber pad because the height of the grouser is about half the thickness of the rubber pad so the rubber pad can be used at only half of its capacity. Further, its service life reduces to 50% according to the capacity of rubber. The rubber pad is consumed whenever it hits the grouser and is thus worn out. Moreover, the grouser always damages the road when the vehicle operates in an urban environment. In addition, the elongation of rubber is also limited by the grouser. One of the problems often encountered with the grouser is that, when the track laying vehicle operates at high speed and turns abruptly, the grouser will cut the rubber pad like a knife because of vehicle speed, load and grouser's position.

The second type is rubber-block type track shoe as shown in U.S. Pat. No. 4,765,694, U.S. Pat. No. 4,765,695, U.S. Pat. No. 4,840,438, U.S. Pat. No. 4,871,216, U.S. Pat. No. 5,069,510 of General Dynamics and U.S. Pat. No. 2,375,170 of Wingfoot Corporation. The advantages are light weight, longer short-term service life of the rubber pad, more stability and less vibration during vehicle motion owing to absorption of vibration in the rubber block, as well as being economical in terms of production and fuel used. Moreover, rubber can be extended up to its full elongation and can be used up to its maximum capacity of life-span until it is thinned to a minimum thickness of rubber at the shoe body without limitation to the grouser. However, its disadvantage is shortened service life of long-term service parts because complete rubber block set has to be replaced. Even if one tried to replace only the rubber pad, this would be impossible due to the structure of metal parts.

Several well-known track shoes for tracked vehicles such as those used in conventional armored personnel carrier vehicles and light/medium combat tanks are made of a metal shoe body with a single pin and combined with a rubber pad. The rubber pad is directional and replaceable. The disadvantage of this type of track shoe is that the directional rubber pad will produce an indication in the trace making it easy to determine the direction in which the vehicle is heading, which is undesirable under warfare scenarios. In addition, with this type of track shoe, an octagonal metal rod connector is used for connecting the track shoes so as to form flexible, i.e., pivotally consecutively interconnected, track shoes. Due to the small area allowance of the bushing, one often encounters the serious problems with this type of assembly that the connector is prone to disengaging from its position or sliding off, and will then scratch against the vehicle body and damage it. Further, this type of track shoe is not suitable for maneuvering the vehicle on snow-covered terrain. If a vehicle is to be adapted to such conditions, the rubber pad must be removed which is very inconvenient. Moreover, the bare-metal track shoe only yields greater ground pressure, which causes higher friction damages to the ground or road surface, which is particularly annoying when the vehicle is operated within a town.

From the past, the army has been developing its efficiency to destroy an enemy or other target and improving its ability to go through armor. On the other hand, the armor has been improved to protect against ammunition (fire attack) accordingly. In fact, improving the defensive armor will generally increase the weight of armored plate on the vehicle. Therefore, all armored track laying vehicles have been upgraded from time to time to carry high defensive armor, for example by increasing the engine power, improving the transmission and suspension to heavy duty requirements. All those upgrades and armor have been increasing the weight of the vehicle. However, nobody has succeeded in improving the track shoe and rubber pad for higher weight vehicles. As a consequence of the high load upon each rubber pad, one of the serious problems often encountered in high temperature terrains, such as in the Middle East, is heat build up phenomena in the rubber pad; the internal rubber may even become explosive when the vehicle runs at high speed and turns abruptly.

The U.S. Pat. No. 5,069,510 (Cory) describes a track for a track laying vehicle including a track shoe, a replaceable road pad, a pin assembly for connecting pairs of the track shoes with hollow pins, and an end connector for connecting ends of the pins cooperating with a center connector in connecting the shoe assemblies.

Another, similar, known type of track shoe has been used with light tanks such as the Scorpion tank of England. However, the major disadvantage of this type of track shoe is that the rubber pad is not replaceable. Once the rubber pad becomes worn or damaged, the entire track shoe needs to be replaced, resulting in higher maintenance costs.

Therefore, there is the need for an improved track shoe assembly for tracked vehicles that enhances the mobility of the vehicle, increases the efficiency of the vehicle and makes it suitable for operation or maneuvering under various terrain types, offers high stability and vibrant absorption, provides longer service range and lifespan, is easy and economical to maintain, and is cost effective between production and utilization. The ultimate goal is to increase the capability of the vehicle when it is operating in practice or warfare scenarios with cost effectiveness and reliability of maintenance.

SUMMARY

The present specification relates to a track shoe for tracked vehicles (crawler-type vehicles); in particular, a track shoe for armored vehicles and the like.

The present specification describes a new and improved track shoe assembly that increases efficiency of the vehicle, improves mobility, and is suitable for operation or maneuvering under wider terrain types, and easy and economical to maintain, using replaceable parts designed as short-term, medium-term and long-term life-span spare parts.

A developed chassis body has a replaceable rubber pad of an otherwise traditional track shoe. The Chassis body provides strength and much lighter weight compared with a conventional metal shoe body. The track shoe according to the specification has a large surface area of rubber pad, having a traditional lightweight rubber block in a rigid shoe body, and a traditional replaceable rubber block with a metal shoe body.

The principles disclosed herein provide added stability and reduced vibration while the vehicle is moving because of vibration absorption from the wide rubber pad. Moreover, it is not only economical in term of production and fuel consumption, but also cost effective due to improved service life and replaceable rubber pad. Therefore, rubber can be extended up to full its elongation and can be used up to its maximum capacity and abrasion to minimal thickness of the rubber pad at the shoe body without limitation of the height of grouser.

In various embodiments, the track shoe assembly for tracked vehicle according to the present specification is an assembly of a plurality of track shoe members and end connectors that side-extended between the track shoe members, with features as follows:

1. A guide member extension chassis frame allows a combination of the rubber-block type and metal shoe body type. The guide member extension chassis frame functions, due to its rigidity, as a metal shoe body holding the replaceable rubber pad. In addition, said extension guided chassis frame has a shoe body with fortified strength so this innovative track shoe will provide sufficient strength like a metal shoe body and flexibility like a rubber-block type shoe body. Moreover, the track shoe assembly may be assembled using a housing with a double pin instead of the single-pin housing widely used in light combat vehicle and armored personnel-carrier vehicles. Double-pin housing ensures providing a tight connection between the pin and the housing because it allows more space and larger size of the rubber bushing, which, in turn, prevents the above-described loosening pin problem in the single-pin track shoe. Due to the diameter and size of the rubber bushing, when that peripheral expanded rubber ring is press-inserted into the housing, it will form an air cell cushion and continuous along track pin interconnected with the track shoe body while it provides a firm connection which reduces the duration of displacement of the pins that also reduces the vibration and friction in operation, thus prolonging the lifespan of the track shoe body.

In addition, recesses on both of the extension guided chassis frame sides provide for reduced friction between guide member and road wheel. Further, the service life of the guide and the road wheel is enhanced over conventional models. The recesses on both sides of guide help to reduce the weight of the vehicle and offer a manufacturing benefit.

2. The renewable rubber pad with two rubber square knots and the curved sheet metal with rims are functioning similar to a grouser in a metal shoe body to hold the rubber pad rigidly. Therefore, the rubber pad can be extended up to its full elongation and can be used up to its maximum capacity and abrasion to minimal thickness of the rubber pad without limitation of the grouser, thus extending the life cycle of the rubber pad.

3. The paddle-ended connector is an extended grouser flange which is an angled paddle with a right-side and left-side paddle. The paddle-ended connector is used to connect one track shoe pin to an adjacent track shoe pin so as to form a flexible pivotal track. The paddle-ended connector functions as an oar for soft soil under conditions such as snow, swamp, mud, desert, and especially in water. The paddle ended connector enables amphibious vehicle to swim in the water, regarding vehicles such as AAV, LVT or other vehicles that are designed to swim in the water such as M113 and have more speed when vehicle is moving in sand, mud and soft ground.

4. The dumbbell-like or X-like pattern of the rubber pad provides such a unique curve to prevent the rubber pad from sliding when the track laying vehicle is traveling at high speeds and turning abruptly. The dumbbell-like/X-like pattern of the rubber pad with no grouser gives the rubber pad a 400% extended life cycle, without the problem of grouser cutting which is often experienced in conventional track shoes. It can be used at full capacity and complete thickness of the rubber pad because there is no limit on the height of the grouser. The service life of the rubber pad at full capacity and complete thickness is longer by at least 2 times in comparison to a conventional rubber pad. Thus, a vehicle with a track shoe according to the present specification is more economical, in particular in terms of lower fuel consumption and reduced manufacturing costs owing to less metal parts used. It is a further advantage of the principles disclosed herein to offer a longer cruising capability of the vehicle, suitable for a wider range of terrains without having to change any specific parts and replaceable parts designed by short-term, middle-term and long-term life-span.

4.1. The dumbbell-like rubber pad provides a much bigger size of surface area than a conventional rubber pad. It can reduce ground pressure by 40% as compared to conventional pads. It can prevent rubber pad explosion from heat build-up when the track laying vehicle is traveling at high speed. As a result of the distributed ground pressure per rubber area, it provides more stability while the vehicle is moving.

4.2. The X-shaped pattern rubber pad enables driving with high mobility and stability in special terrain such as mud and snow. The X-like pattern of the rubber pad can prevent the rubber pad from sliding when the track laying vehicle moves in mud and snow. There is no difficulty to run in normal terrain for example in urban roads contrary to conventional pure metal snow shoes that damages urban road. The idea of The X-shaped pattern rubber pad is that the vehicles can change rubber pads to X-shaped pattern from the military base camp when vehicles are in winter climate. Then, there is no delay time to change rubber pads when vehicles hit the snowbound terrain in the warfare scenarios.

The dumbbell-like pattern rubber pad and the X-like pattern rubber pad are assembled onto the track shoe body by a suitable fastening means while allowing easy disassembling of the rubber pad when a replacement is needed. The rubber pad has a wide surface area allowing more ground contact, and its surface pattern provides better cruising ability and ensures the stability of a vehicle over a wider range of terrain conditions. In addition, the rubber pad is designed without an indication of direction so it is difficult to detect the direction in which the vehicle is heading which is a desirable tactic in military deployment. Further, the rubber pad is a short-term life-span part; when it becomes worn-out or damaged, only the rubber pad needs to be replaced, without having to change the entire track shoe assembly. As result, maintenance is simpler and more economical.

BRIEF DESCRIPTION OF THE DRAWINGS

A preferred, non-restrictive embodiment is discussed below with respect to the accompanying drawings.

DETAIL DESCRIPTION OF THE PREFERRED EMBODIMENTS

Figure 1:
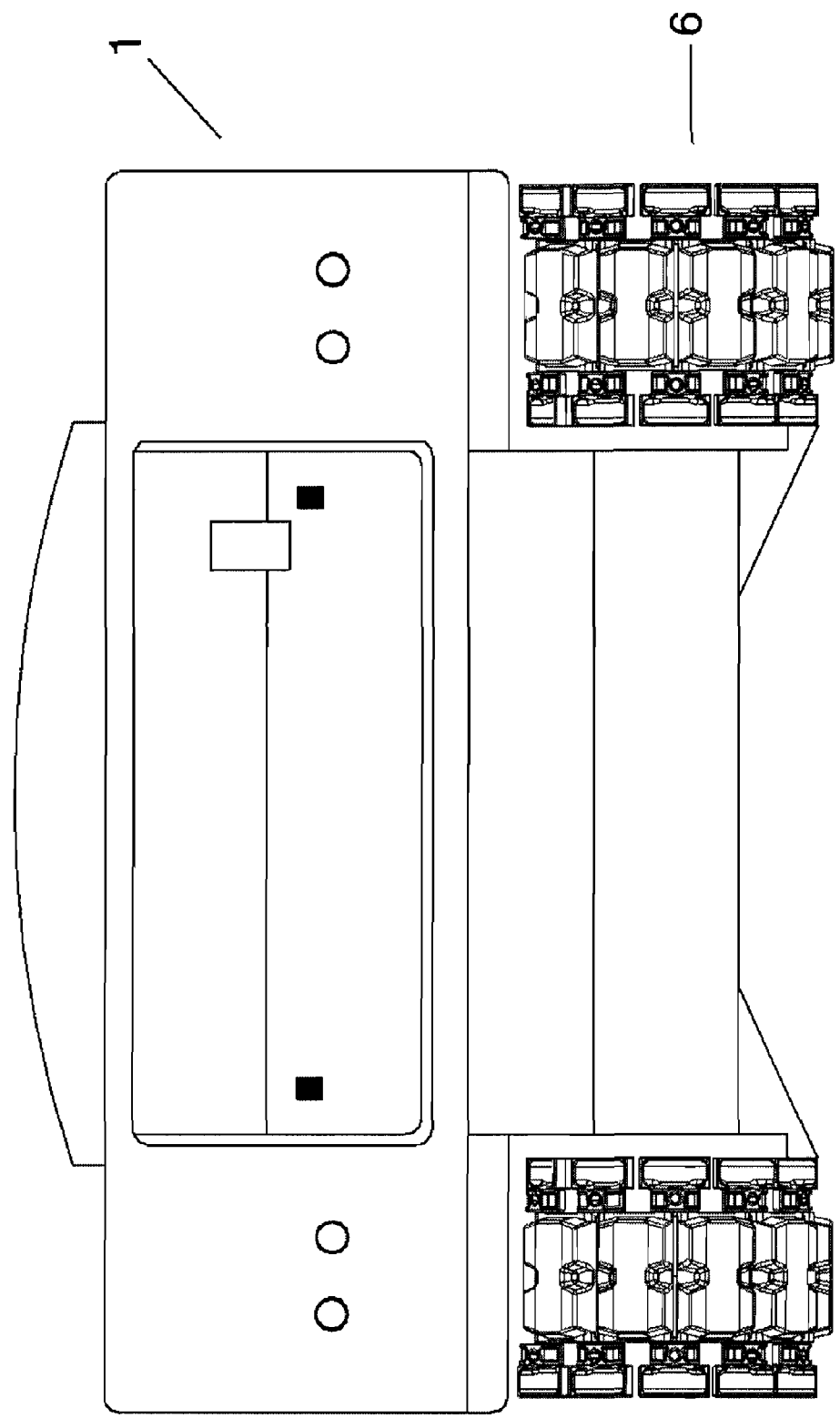
FIG. 1 is a front view of track shoes having a dumbbell-like pattern rubber pad employed in a track laying vehicle.

The track shoe assembly as described herein is developed for use with track laying (crawler-type) vehicles such as armored personnel carriers, tanks including light and medium tanks. The track shoe assembly according to the present specification will be described hereinafter by way of example of a preferred embodiment, specifically referring to the drawings.

Figure 2:
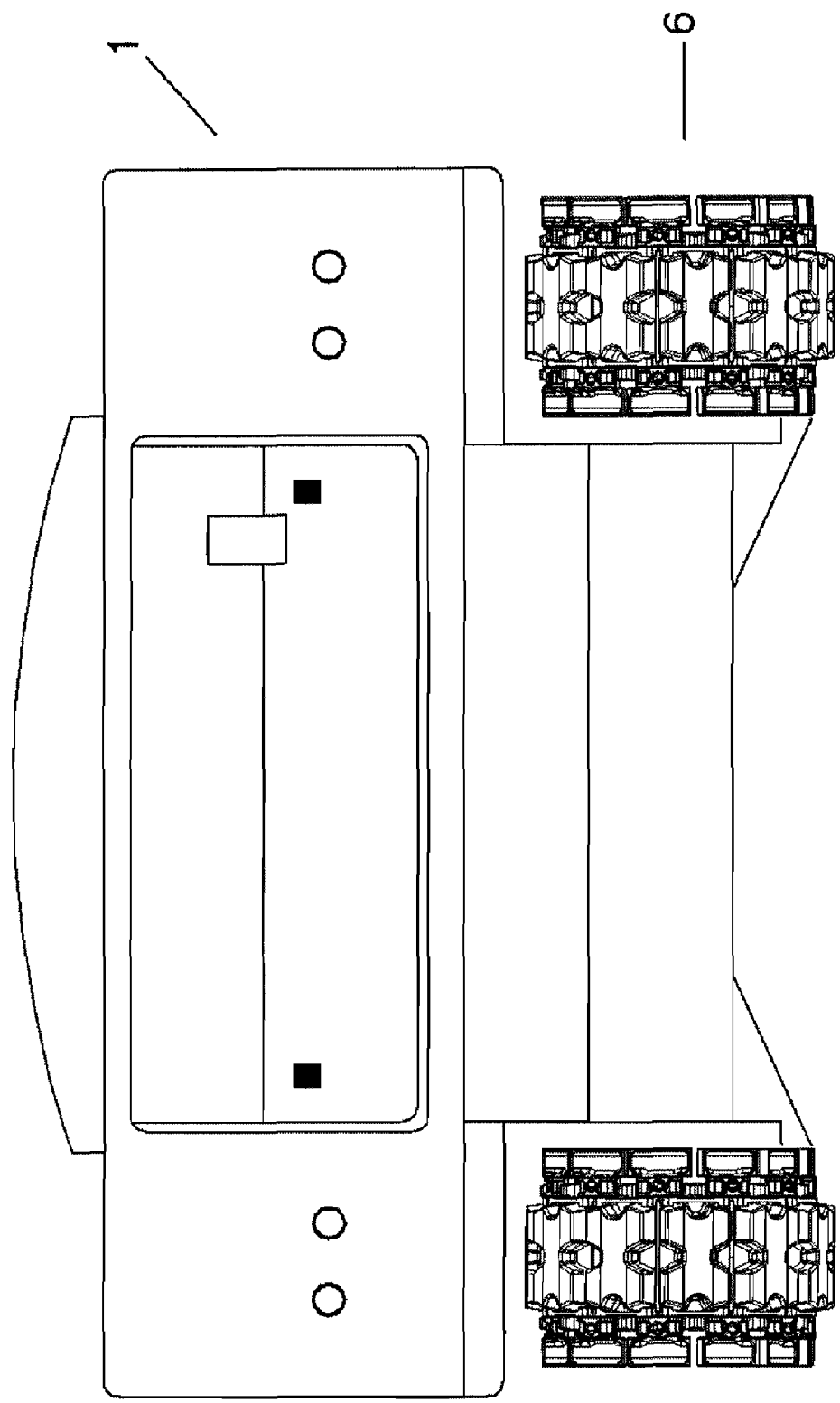
FIG. 2 is a front view of track shoes having an X-like pattern rubber pad employed in a track laying vehicle.
Figure 3:
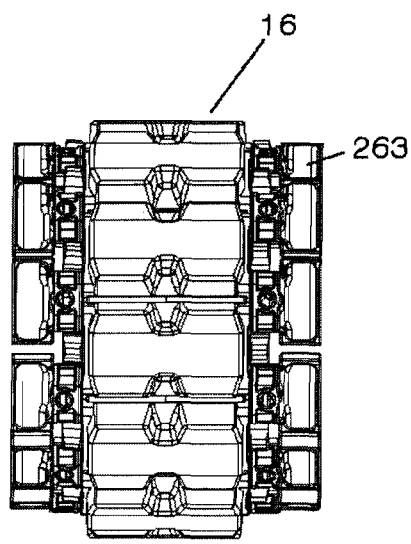
FIG. 3 is a front view of the dumbbell-pattern track shoes as in FIG. 1.
Figure 4:
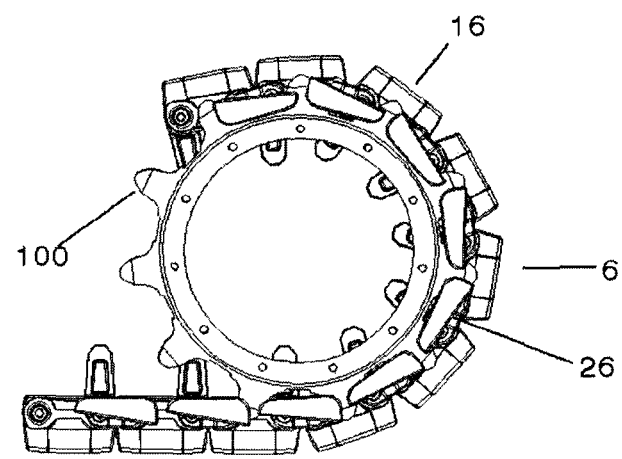
FIG. 4 is a side view of the track shoes of FIG. 3 assembled on a sprocket wheel.
Figure 5:
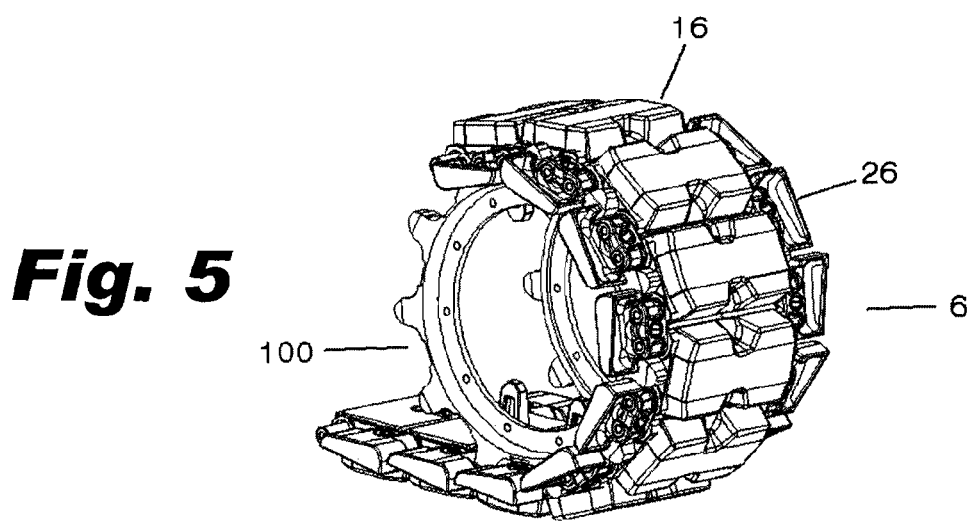
FIG. 5 is a perspective view of the track shoes of FIGS. 3 and 4.

FIGS. 1 and 2 show the track shoe assembly 6 with dumbbell pattern and X-pattern, respectively, for track laying vehicle 1 according to the preferred embodiment, installed for use with an armored personnel carrier. FIGS. 3, 4 and 5 show track shoe assembly 6 assemblies mounted on a sprocket wheel 100. The track shoe assembly 6 comprises several double-pin track shoe members 7 and end connectors 26 and a rubber pad assembly 16 as shown in FIG. 6.

Figure 6:
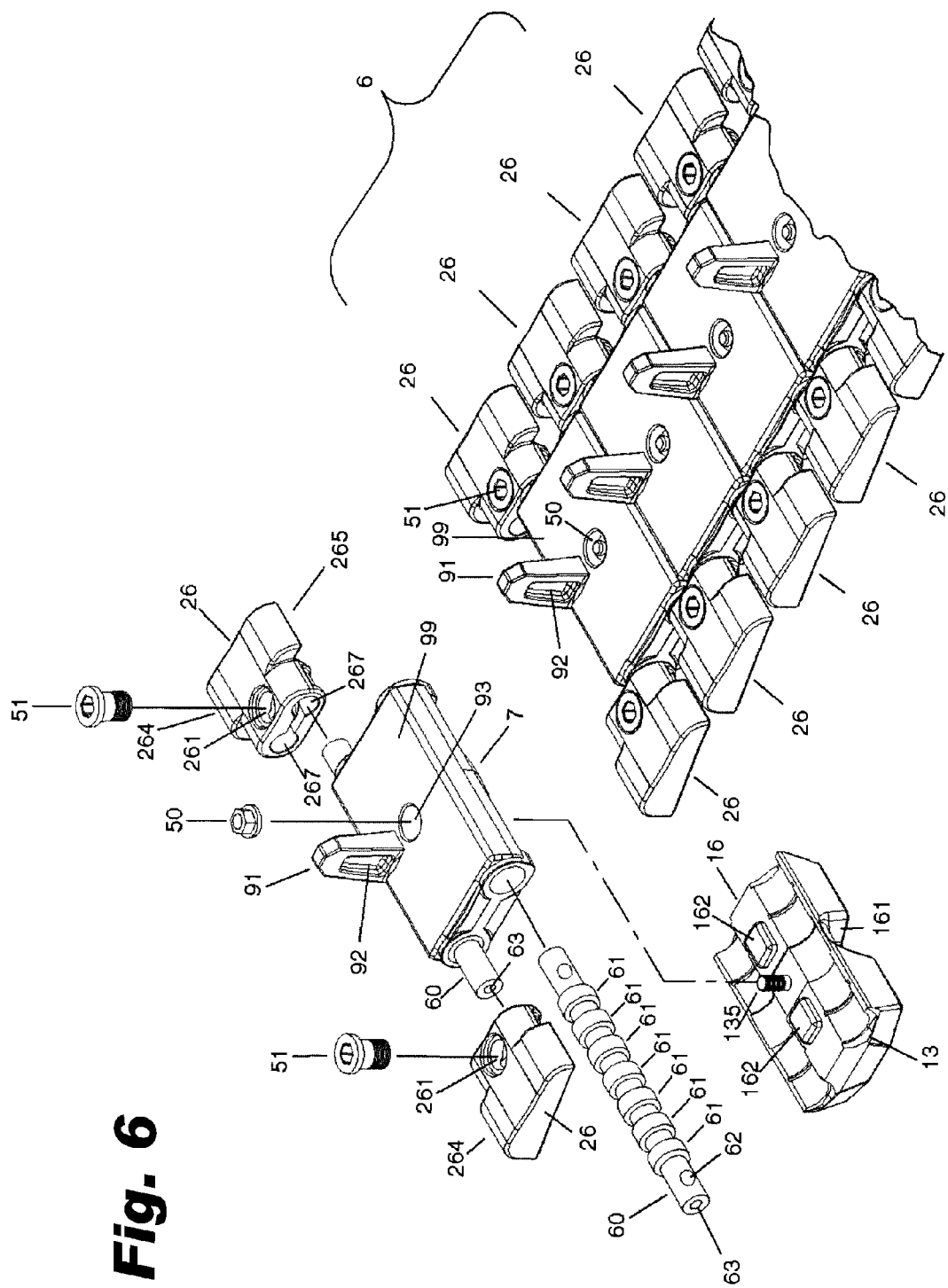
FIG. 6 is an exploded perspective view of the track shoes of FIG. 3.

With reference to FIG. 6, the construction of the track shoe assembly 6 is now described briefly to facilitate understanding of each component thereof, prior to a detailed description of the components. Along the length of the track shoe assembly 6, a number of shoe bodies 99 are arranged in a side-by-side relationship and serve to support road wheels for movement over the ground on which the vehicles are traveling. Each shoe body 99 includes a renewable dumbbell or X-like pattern rubber pad 16 for engaging the ground during vehicle motion. The rubber pad 16 comprises two rubber square knots 162 on a curved sheet metal 13 which is used to lock the rubber pad rigidly with shoe body 99. The rubber pad 16 can be replaced by unscrewing and releasing the screw 135 with nut 50. A pair of pin assemblies 60 extends through each of the aligned shoe bodies 99 to permit movement of the shoes with respect to each other. Each pin assembly 60 includes a hollow pin 63 having a construction that makes the track shoe assembly 6 lightweight without sacrificing strength of the pins at the required locations. The pin 63 is locked by means of a notch 62 with a half-way threaded bolt or screw 51 with a corresponding end connector 26. The rubber bushing attached on each pin assembly 60 provides a tight connection with shoe body 99 with less vibration while vehicle moving. The end connectors 26 connect the adjacent ends of the pin assemblies 60 as more fully described hereinafter.

Figure 7:
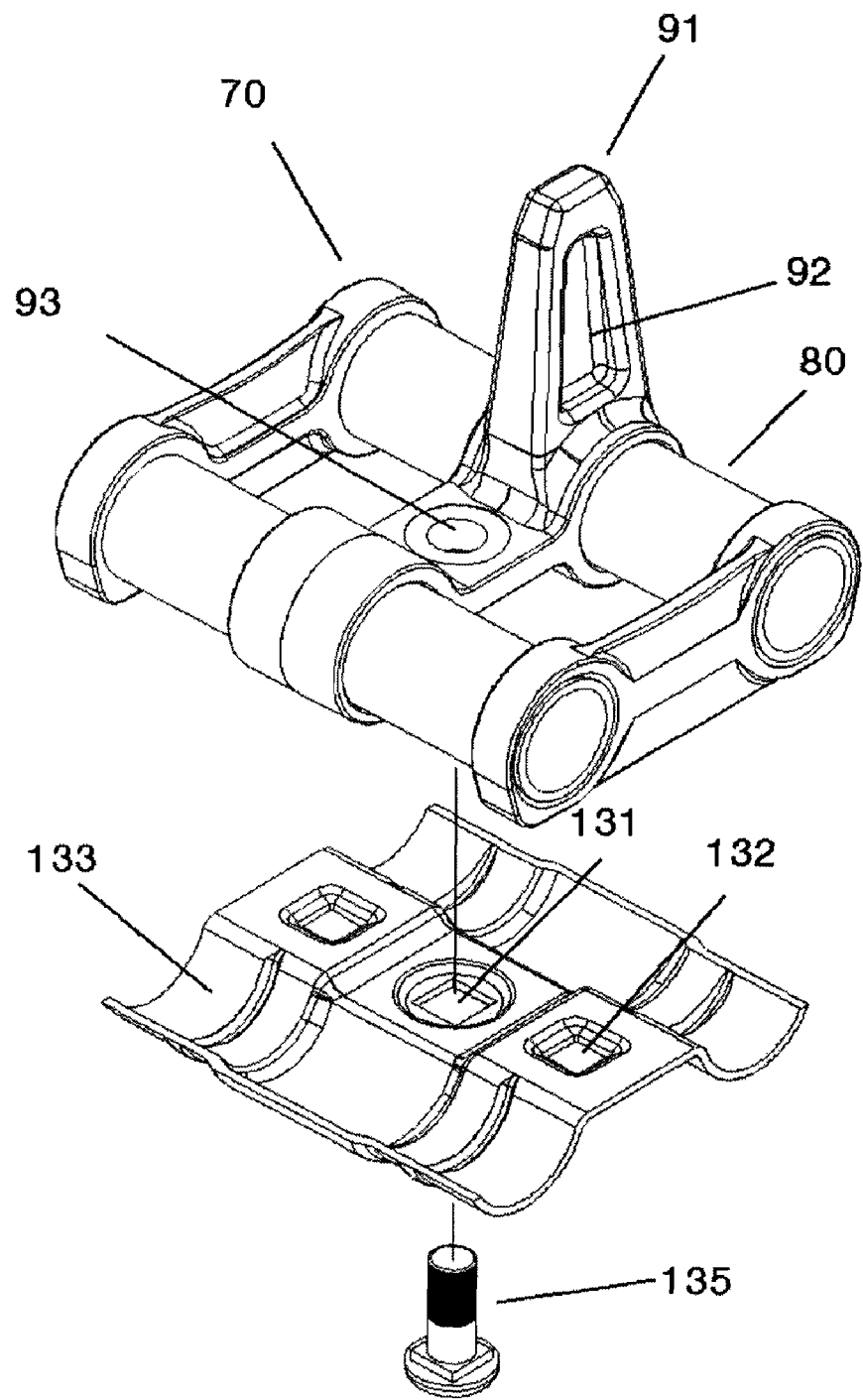
FIG. 7 is a perspective view of a track shoe body in a not yet rubberized condition.

As illustrated in FIG. 7 the chassis assembly comprises two tubular pipe housings 80 inserted into sleeves 94, 95, respectively, thus securing the two pipe housings 80 while maintaining the distance between them. Two end members 70 are mounted on either end of the pipe housings 80 so each end of each pipe housing 80 is fitted inside a corresponding hole of the end member 70. The sleeve 94, 95 are positioned at the center of the pipe housings 80. The end members 70 are copper-brazed or welded to form a chassis assembly. The chassis assembly is then provided with a rubber surface including the rubber pad 16; the rubber pad is fastened by means of the rubber square knots 162 extending through the square recess 73 in the spaced web-portion to form a complete double-pin track shoe member 7. A hole 93 is prepared at the location on the center of spaced web-portion between the sleeves 94, 95.

Figure 8:
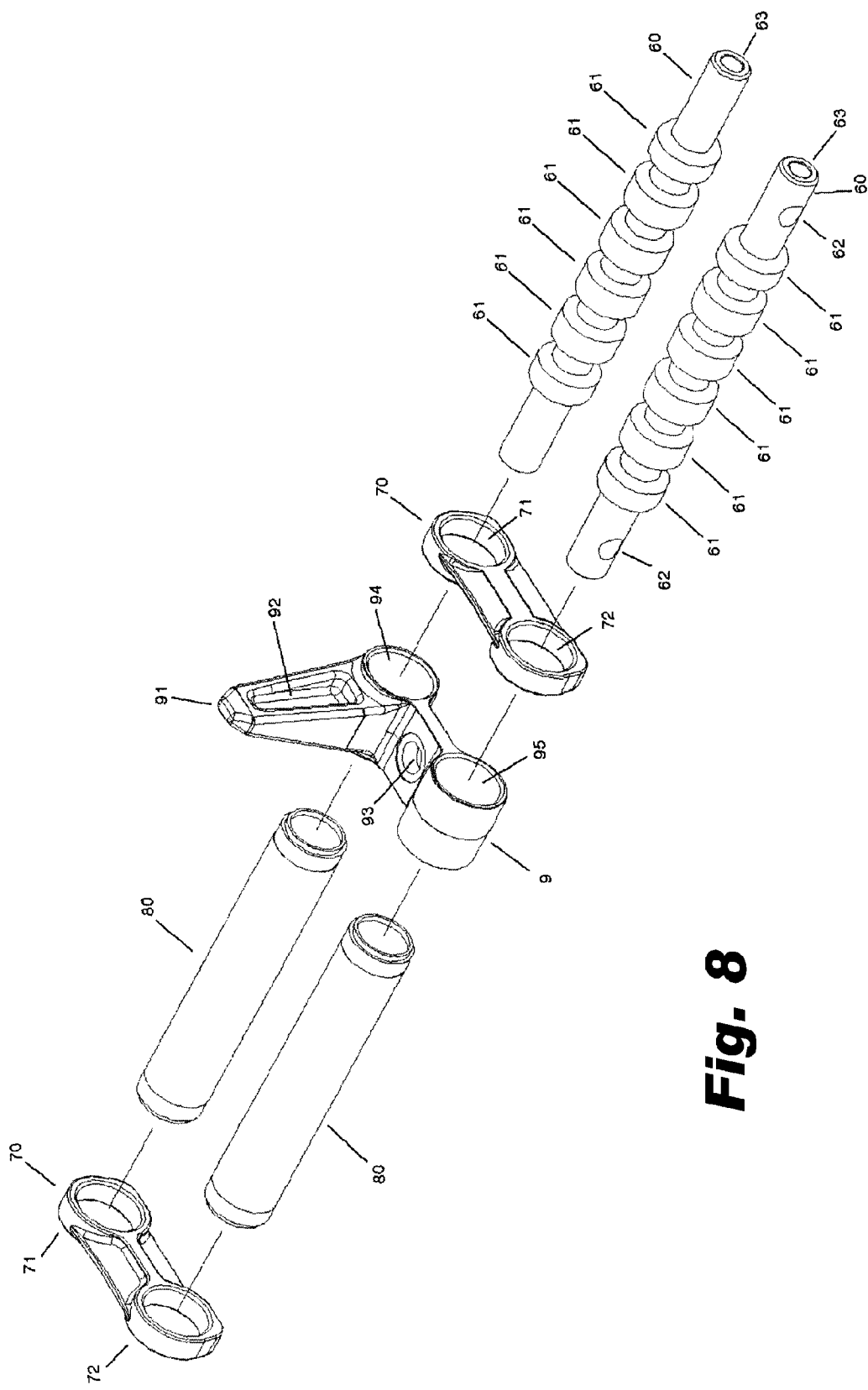
FIG. 8 is an exploded perspective view of the track shoe body housing in FIG. 7.

FIG. 8 illustrates an exploded view of the double-pin shoe body 99 assembly prior to rubber-molding. It consists of extension guided chassis 9, serving as a chassis of shoe body 99, and tubular pipe housings 80 assembled through hole 71, 72 on end member 70 on both side as a shoe body frame. Chassis and frame provide strength of shoe body under vehicle load.

Each of the rubber-bushed pins 60 is press-inserted into the respective pipe housing 80, which is preferably made of steel, having a determined length. The track shoe pin 60 is bushed with a plurality of rubber rings 61 which are disposed spaced apart in a controlled manner along the length of the pin 60. The outside diameter of the rubber rings is a little larger than the inside diameter of the tubular pipe housing 80, so after press-inserting the rubber rings the periphery of rubber rings will press against the inner surface of the housing to tighten the rubber ring sequence and seal them against the housing, thus forming an air cell cushion which reduces the vibration of the vehicle and lowers the friction of torque force between track shoe pins and pipe housing. Track shoe pin 60 is provided with a notch 62 at the same level at both ends.

The sleeves 94, 95 are realized as two tubular sleeve structures corresponding to the shape of the pipe housing 80. While spaced apart, the tubular structures of the sleeves 94, 95 are connected by a spaced web-portion. The end member 70 is a metal plate, preferably made from steel, having two holes 71, 72 of a size corresponding to the size of the tubular pipe housing 80, so that the tubular pipe housing 80 can be inserted into the hole 71, 72 and welded firmly thereafter.

Figure 9:
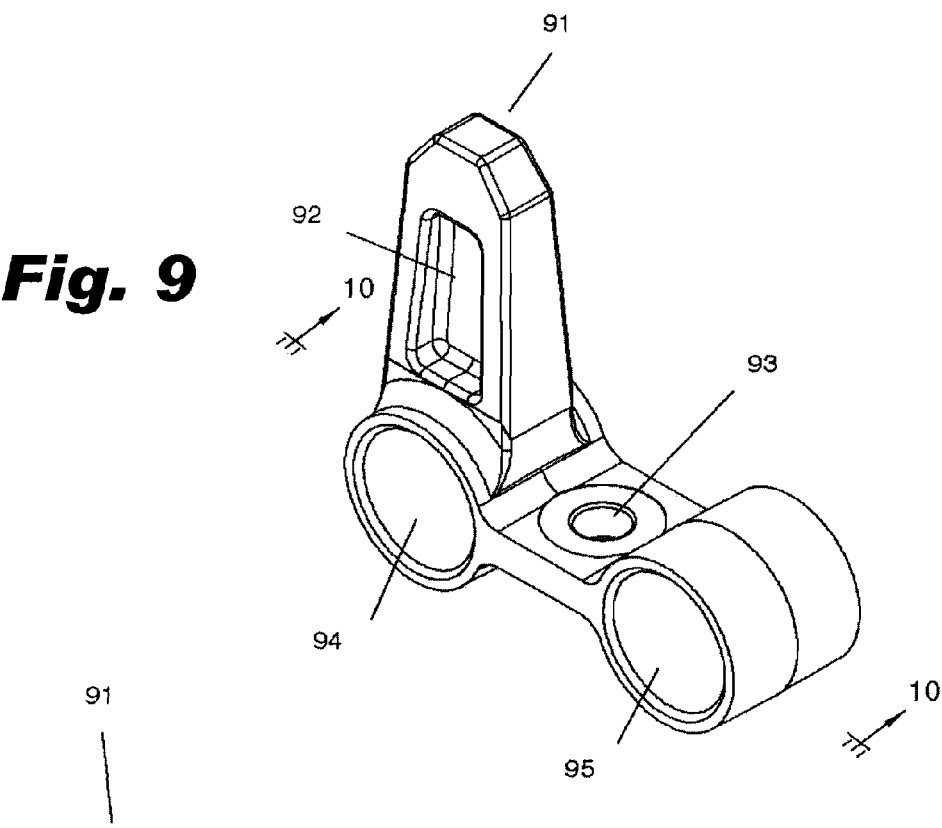
FIG. 9 is a perspective view of extension guided chassis in FIG. 8.
Figure 10:
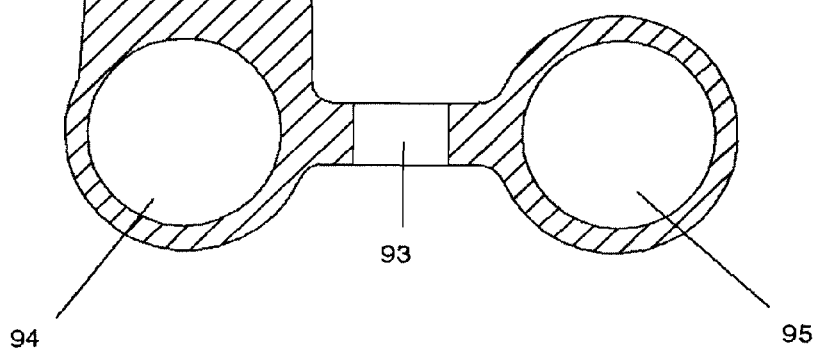
FIG. 10 is a sectional view taken along line 10-10 in FIG. 9.

With reference to FIGS. 9 and 10, the extension guided chassis 9 has a guide member 91 and a hole 93 that is in the center of the spaced web-portion which is configured for receiving engagement of the rubber pad assembly 16 to the track shoe body 99, which will be described below. The guide member 91 has a tapered shape: its wider base covers the top surface of the tubular sleeve while its top is narrower than its base. Recesses 92 are prepared on both sides of the guide member 91. The guide member 91 and the assembly 6 containing it have lower friction and prolonged life cycle in operation as well as reduced weight. Beside reduction of friction during operation between the guide member 91 and the road wheel, this also decreases vibration of the track shoe assembly 6 of the vehicle 1, which in turn prolongs the lifespan of the track shoe 99 and road wheel.

Figure 11:
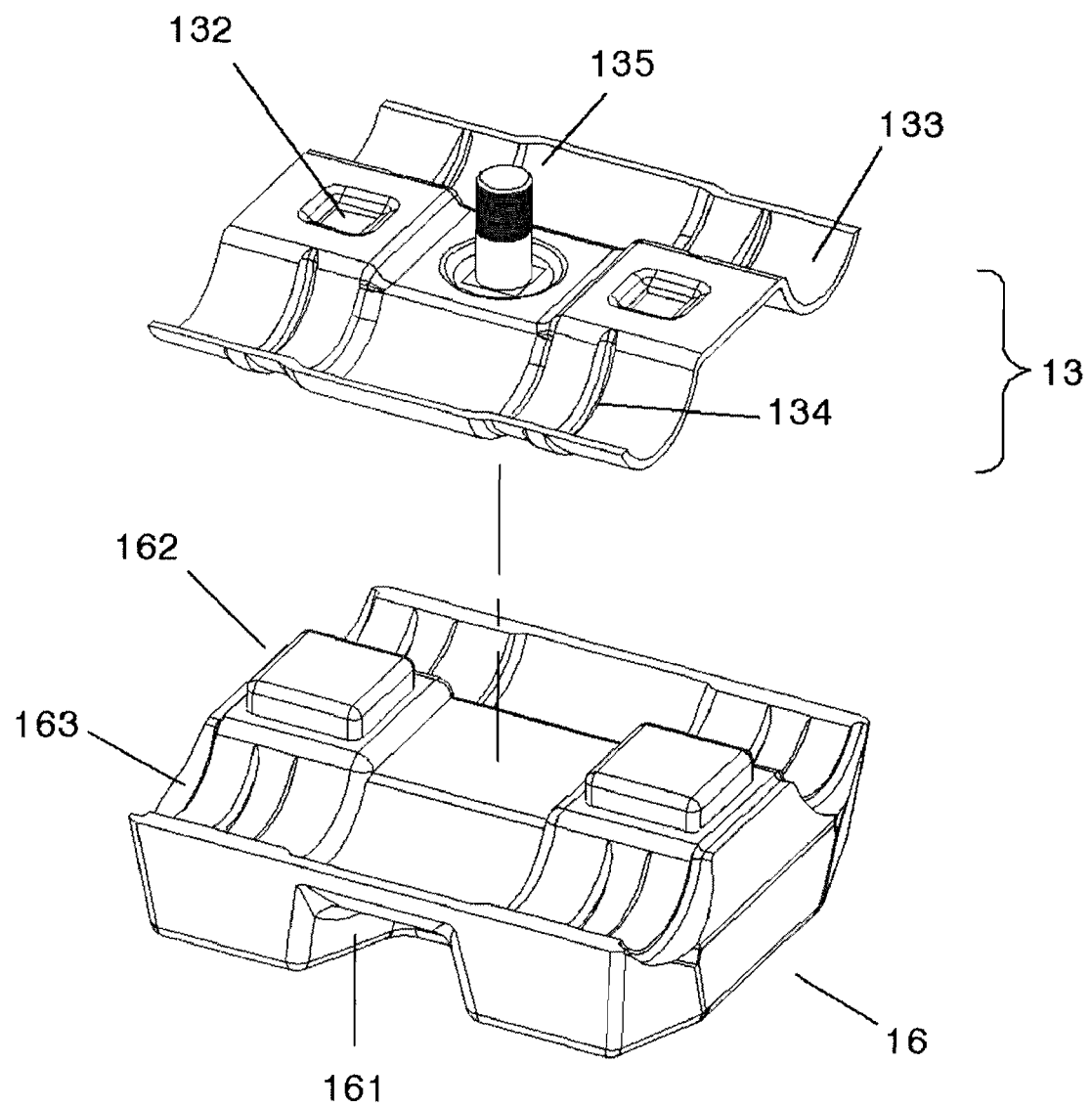
FIG. 11 is an exploded perspective view of the track pad with a dumbbell-like pattern in FIG. 6.
Figure 12:
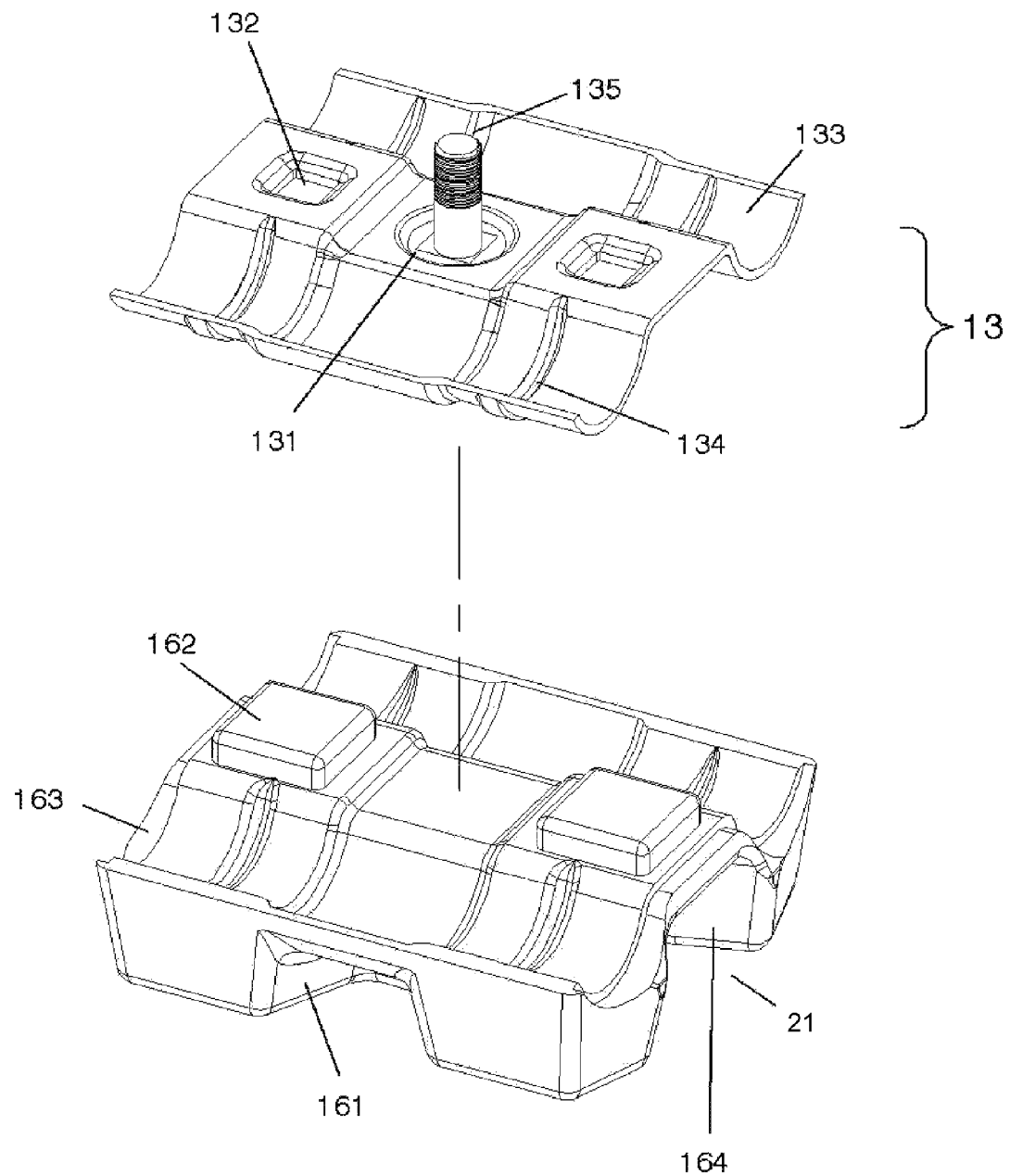
FIG. 12 is an exploded perspective view of the track pad with an X-like pattern.

As illustrated in FIGS. 11 and 12, the rubber pad assembly 16 is made of a combination of the curved sheet metal 13 with the rubber pad with defined thickness and configuration, which is pressed onto the sheet metal plate for bonding and forming a complete dumbbell-like pattern rubber pad assembly 16 or X-like pattern rubber pad 21, respectively.

Figure 13:
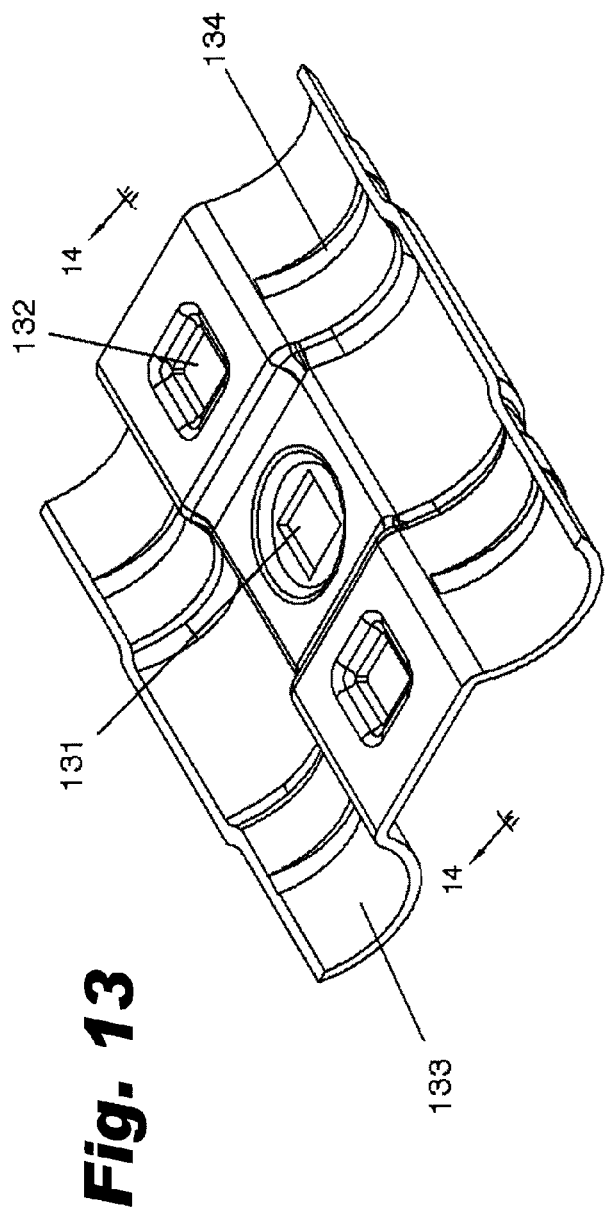
FIG. 13 is a perspective view of the curved sheet metal in FIGS. 11 and 12.
Figure 14:
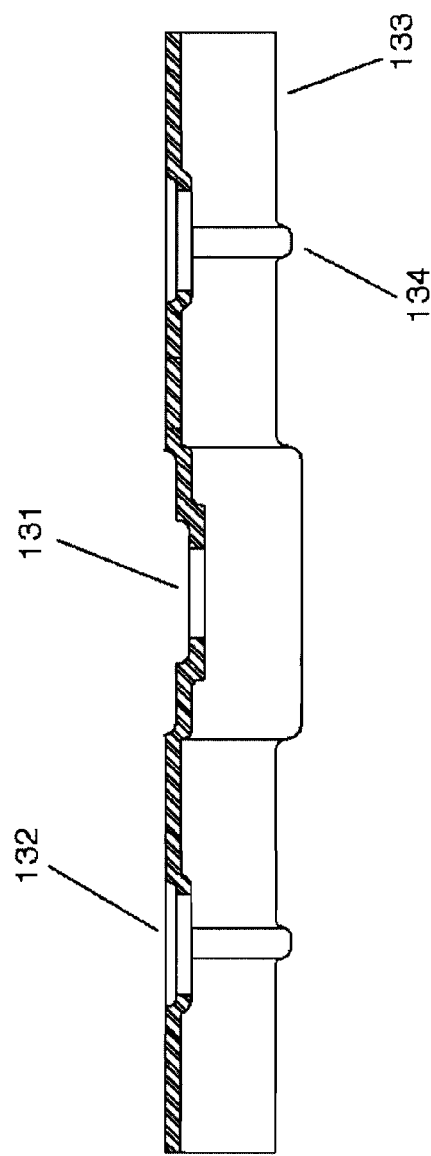
FIG. 14 is a sectional view taken along line 14-14 in FIG. 13.

Referring to FIGS. 13 and 14, the curved sheet metal 13 is designed with a curve 133 and ribs 134 to obtain rigidity within the shoe body 99. The square hole 132 on the sheet metal is realized with a recession designed to hold the rubber buttons (square knots) 162 after rubberizing. Further, the rubber button 162 will lock with shoe body 99 to increase the rigidity of the shoe body 99 when joined with the square recess 73 the rubber pad assembly 16, 21. A bolt 135 is pressed suitably at square hole 131 of the sheet metal 13 before rubberizing. After rubberizing, the bolt 135 will be inserted into the shoe body 99 through the hole 93 to fasten with nut 50. Then, track shoe assembly 6 is ready for use, possibly as a replace part for a worn-out part.

Figure 15:
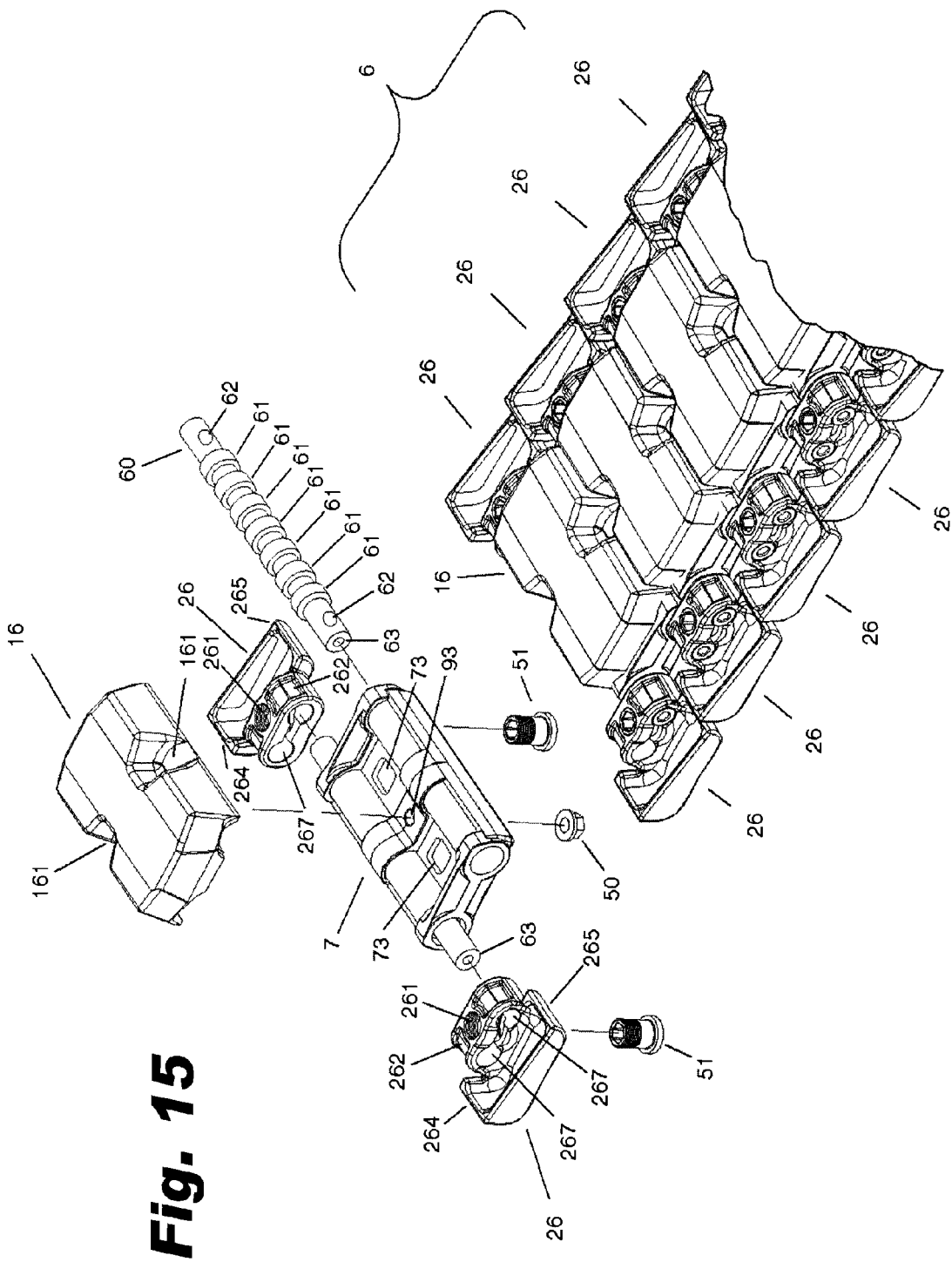
FIG. 15 is an exploded perspective view of the track shoe with the dumbbell-like pattern rubber pad according to the principles disclosed herein.

As shown in FIG. 15 the completed track shoe body 99 is connected to next track shoe assembly at both ends by the end connectors 26. On both sides of the track shoe body 99, an end connector 26 is assembled to form an endless track shoe assembly 6 by connecting with track shoe pin 60 which protrudes from track shoe body 99 beyond the end member 70 and engaging with its parallel tubular structure to the next track shoe pin 60 of the adjacent track shoe body 99. The end connector 26 is then fastened firmly by using a suitable fastening means, preferably by using a half-way threaded bolt 51 with threaded tail section to fasten the notch 62 prepared on the top surface of the end connector 51, usually caulking the surrounding of the bolt first then to lock firmly the bolt, a person skill in the art are always practice this way.

As described earlier, a notch 62 on each end of the track shoe pin 60 is provided for the insertion of the half-way threaded bolt 51 into the track shoe pin 60, wherein the notch 62 prepared on the track shoe pin 60 should face sideway. With this arrangement, once the end connector 26 is engaged to the two track shoe pin 60, and the half-way threaded bolt 51 is fastened the threaded tail of half-thread bolt 51 and the notch 62 will perfectly couple to one another resulting in a more secure engagement between the end connector 26 and the track shoe pin 60, with the half-thread bolt 51 reducing the likelihood of disengaging of the track shoe pin 60 as compared to the conventional track shoe assembly.

Figure 16:
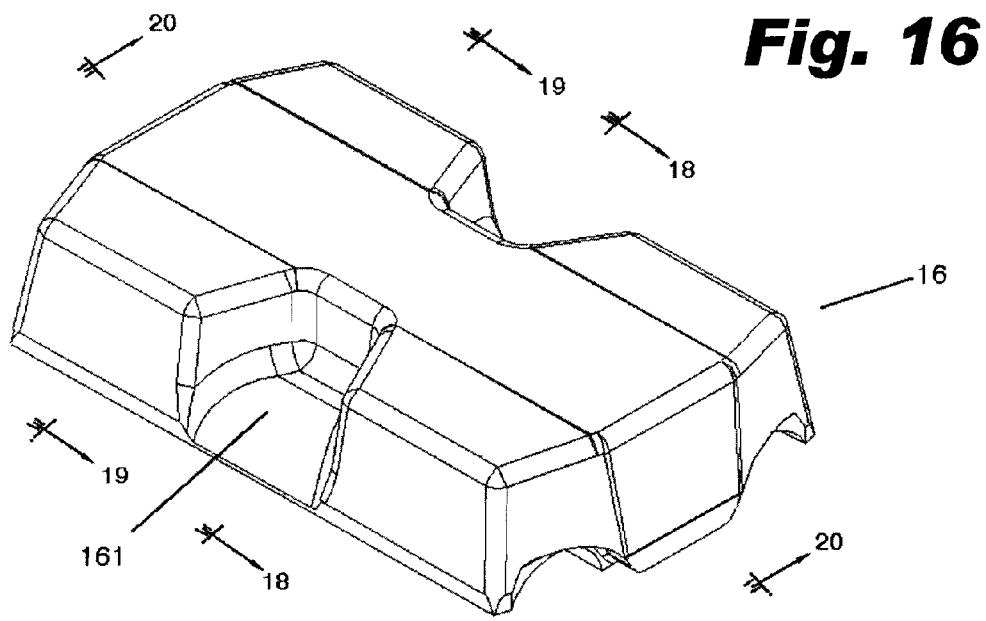
FIG. 16 is a perspective view of the dumbbell-like pattern rubber pad in FIG. 15.
Figure 17:
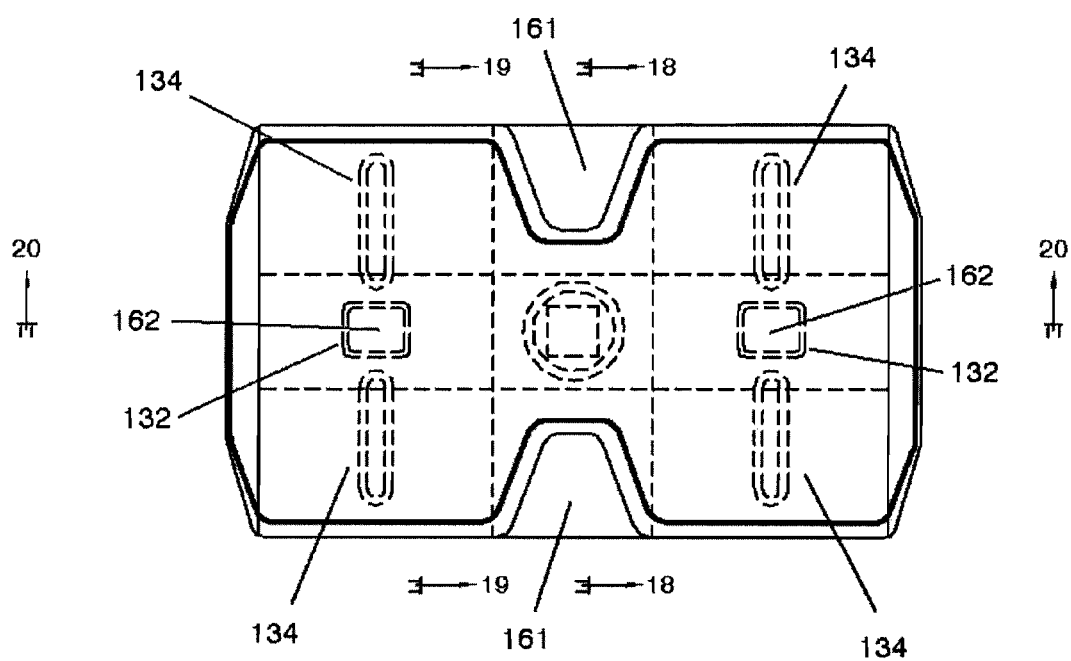
FIG. 17 is a bottom view of the rubber pad of FIG. 16.
Figure 18:
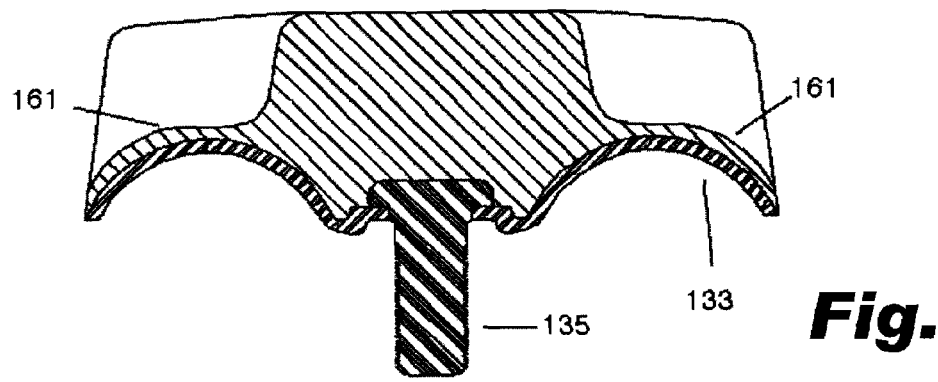
FIG. 18 is a sectional view taken along line 18-18 in FIGS. 16 and 17.
Figure 19:
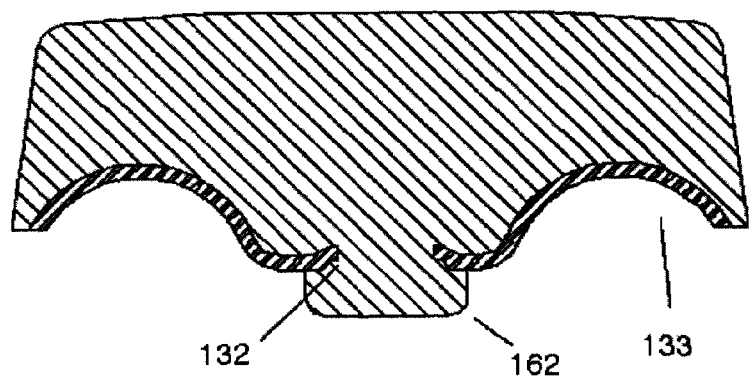
FIG. 19 is another sectional view taken along line 19-19 in FIGS. 16 and 17.
Figure 20:
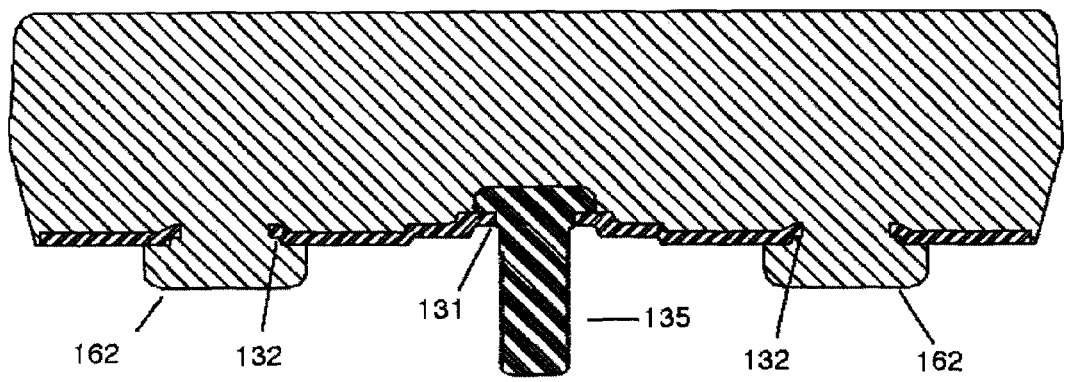
FIG. 20 is a further sectional view taken along line 20-20 in FIGS. 16 and 17.

FIGS. 16 to 25 illustrate preferred realizations of the rubber pad. Referring to FIG. 16, the rubber pad 16 is made with a combination of formed curved sheet metal 13 and a rubber, wherein the curved sheet metal 13 is mold-shaped to form two curves 133 and rims (ribs) 134 with a flat channel according to the corresponding to the shape and size of the track shoe body 99. On the concave side of the shaped metal plate, a fastening means realized as bolt 135 and nut 50 is provided at the position corresponding to the location of the hole 93 on the track shoe body (including a hole provided on the spaced web-portion of the extension guided chassis 9) so that the bolt 135 on the sheet metal can be used to fasten the track shoe 99 through the holes 93. On the other side of the shaped metal plate, rubber with defined thickness and configuration is mold-pressed to the mentioned surface by fastening the square knots (rubber buttons) through the square recess 73 in the formed sheet metal when the rubber is molded. The complete rubber pad 16 is then attached to the track shoe 99 using the prepared nut 50 and bolt 135.

It is important for the operation and maneuvering of the vehicle that the rubber pad 16 will come in contact with the ground/terrain surface. Therefore, the configuration of the front surface of the rubber pad 16 is very essential with regard to improving mobility, stability or cruising ability of the vehicle. The front side (or bottom side) is the side facing towards the ground when the track shoe member is touching ground. Such specific configuration of the pattern will prevent rubber pad explosion and sliding when the track laying vehicle runs in high speed, in particular when it turns abruptly, especially in the terrain of the Middle-East.

Figure 21:
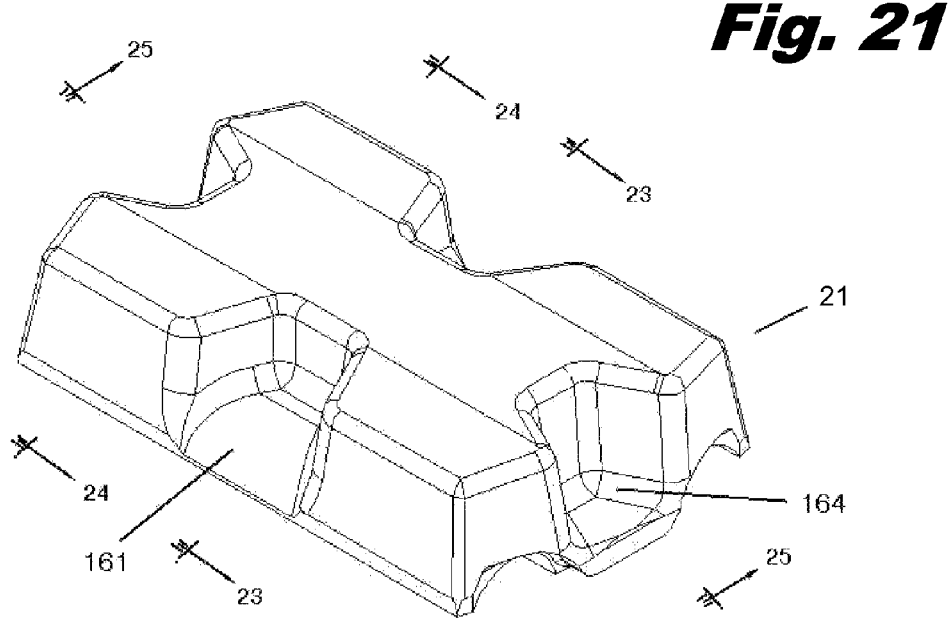
FIG. 21 is a perspective view of an X-like pattern rubber pad.
Figure 22:
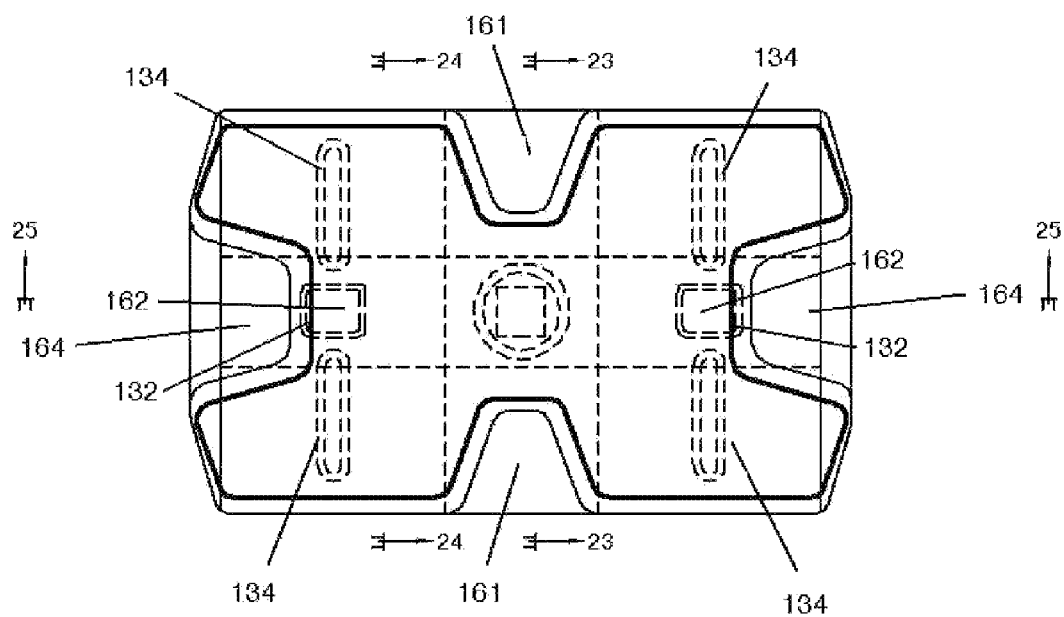
FIG. 22 is a bottom view of the X-like pattern rubber pad of FIG. 21.
Figure 23:
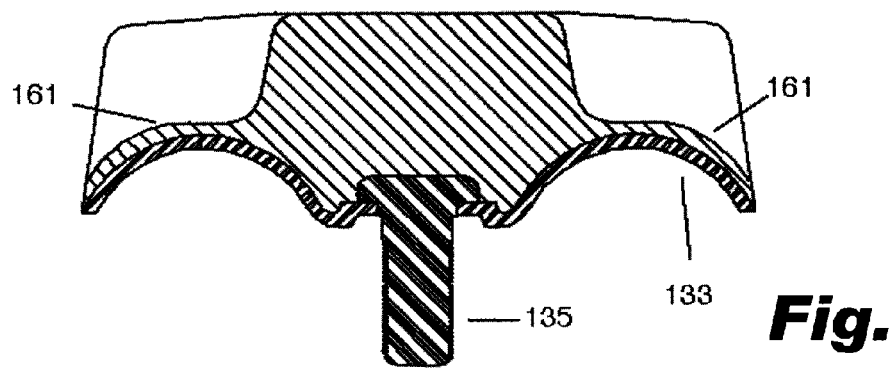
FIG. 23 is a sectional view taken along line 23-23 in FIGS. 21 and 22.
Figure 24:
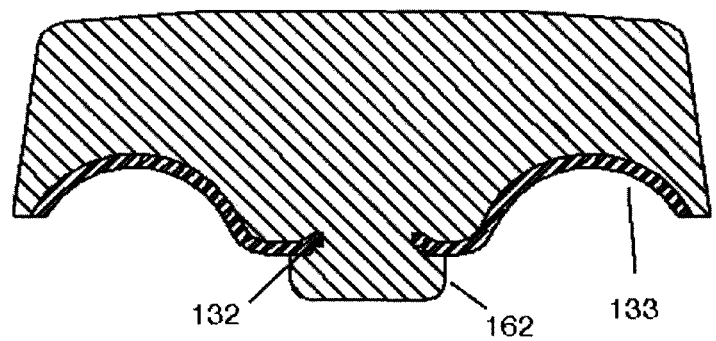
FIG. 24 is another sectional view taken along line 24-24 in FIGS. 21 and 22.
Figure 25:
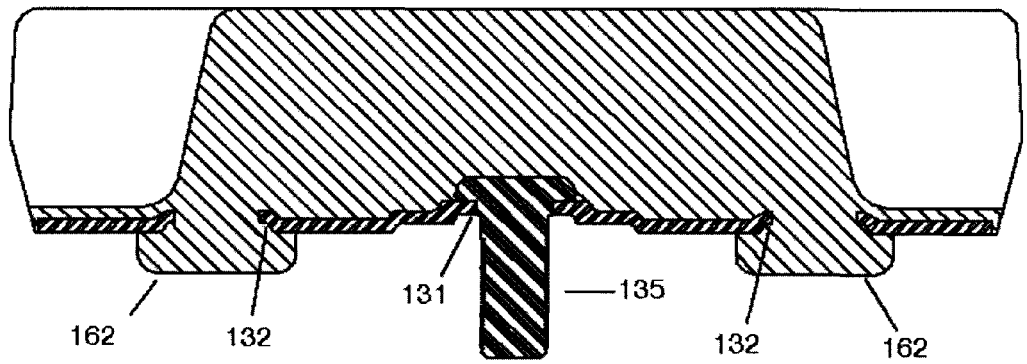
FIG. 25 is a further sectional view taken along line 25-25 in FIGS. 21 and 22.
Figure 27:
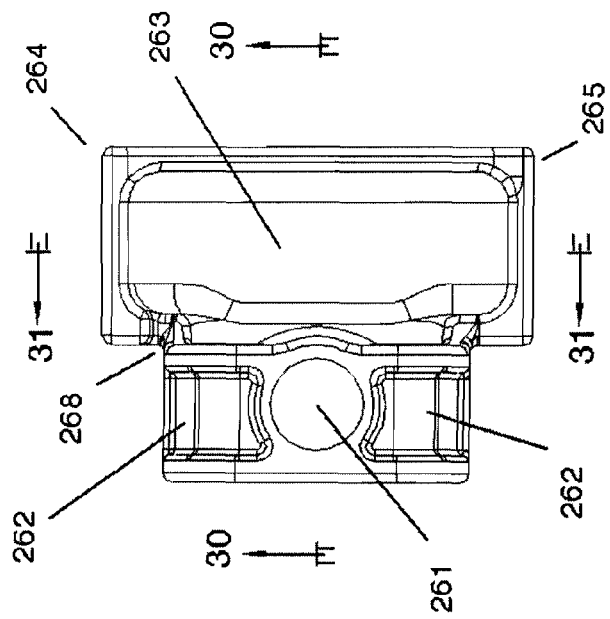
FIG. 27 is a top view of the ended connector of FIG. 26.
Figure 26:
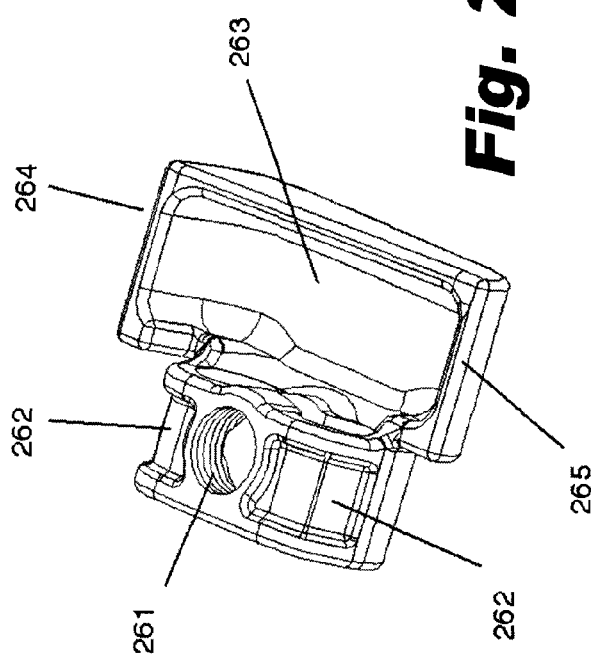
FIG. 26 is a perspective view of the end connector in FIG. 15.
Figure 28:
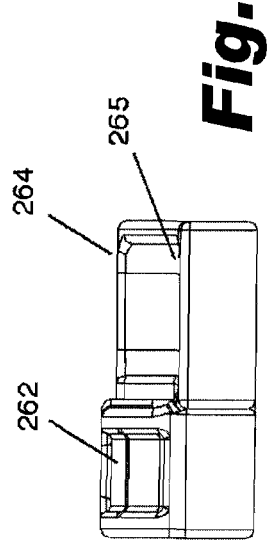
FIG. 28 is a front view of the ended connector of FIG. 26.
Figure 31:
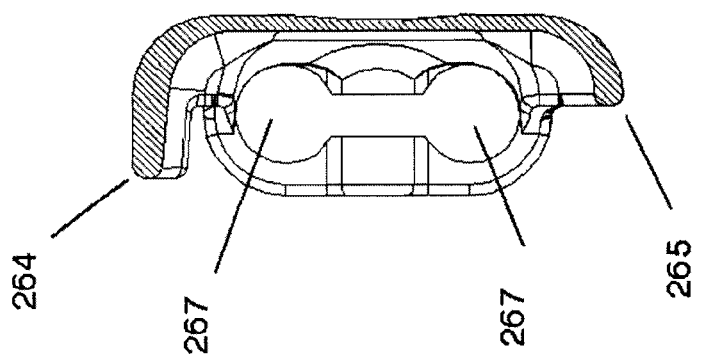
FIG. 31 is a sectional view taken along line 31-31 in FIG. 27.
Figure 30:
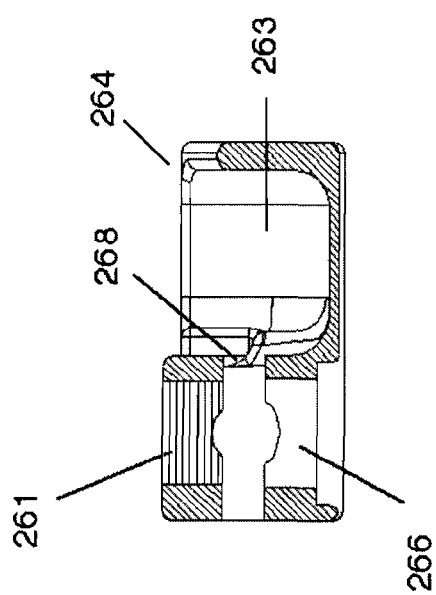
FIG. 30 is a sectional view taken along line 30-30 in FIG. 27.
Figure 29:
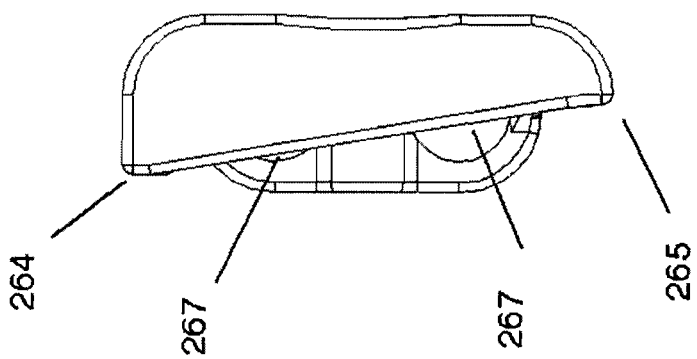
FIG. 29 is a side view of the ended connector of FIG. 26.

The track shoe assembly according to the present specification incorporates different configurations of the rubber pad assembly 16, 21. For example, in FIG. 16, the surface of the rubber pad assembly 16 is configured into a dumbbell-like pattern 16. In FIG. 21, the rubber pad 21 is configured into an X-shape-like pattern 21. The main difference is the gap 164 on both sides of the X-shape-like pattern 21, which provides the ability to dig in mud and snow in case the vehicles move in such conditions.

According to the present specification, the rubber pad assembly 16 has a wide surface pattern which improves stability of the vehicle as it provides better grip against the ground/terrain surface, In addition, the design of the surface pattern of the rubber pad assembly 16 according to the present specification causes less ground pressure, not only making it road friendly (avoiding damage to the road surface), but also making it suitable for maneuvering the vehicle 1 over a wide range of terrain types.

Example 1

The surface pattern of the rubber pad configured in dumbbell like pattern 16 and X-shaped like pattern 21, the specific surface pattern of the vehicle 1 can be operated efficiently over significant terrain.

The X-shaped like pattern 21 is designed for snow covered terrain, and it is not necessary to change the rubber pad for a snow shoe which damages the urban road and consumes a lot of engine power like with the conventional track shoe. The vehicles 1 equipped with the track shoe assembly 6 with X-like pattern 21 can also run on all terrain including urban roads without damaging them. Thus, vehicle 1 can change rubber pad to be X-like pattern 21 from military base camp in the winter. Then there is no delay time to change the rubber pad when vehicle 1 hit the snow terrain in the warfare scenario.

The vehicles 1 equipped with the track shoe assembly 6 with dumbbell like pattern 16 according to this specification also operate well under desert condition, soft soil, and/or swampy condition. The dumbbell like pattern 16 could prevent heat build-up problem when vehicle 1 runs on a hot sand terrain.

Example 2

The pattern of the front surface of the rubber pad assembly 6 configured into dumbbell like pattern 16 and/or X-shaped like pattern 21 according to this specification are designed to be non-directional indicator pattern. That is, the pattern on the surface of the rubber pad assembly 16, 21 are symmetrical, making it difficult to determine the direction which the vehicle is traveling. This is desirable and ideal under warfare scenarios as the oppose party will have difficulty in tracing the vehicle.

Further, the track shoe assembly according to the present specification includes component parts that are designed to be replaceable by short-term, middle-term and long-term lifespan. Thus, after wear off or damage components may be replaced when necessary without having to replace the entire unit unlike the traditional products of track shoe bodies in which the entire unit has to be replaced even though part of the components are still in good condition.

According to the present specification, if the rubber pad assembly 16, 21 of the track shoe 6 is worn off, the rubber pad assembly 16, 21 may be simply replaced. For this, only the nut 50 is unfastened to replace the worn part with a new rubber pad assembly 16 or 21; it is unnecessary to replace the entire track shoe body 99. This feature keeps maintenance of the vehicle 1 easy, simpler and economic.

With reference to FIGS. 26 to 31, the end connector 26 is used for connecting the completed track shoe assembly 99 to another adjacent track shoe assembly 99. A plurality of end connectors 26 is needed to connect the track shoe assembly 99, in order to form a flexible pivotal and endless interconnected track laying shoe 6 over the road wheels (not shown).

The end connector 26 comprises a curve metal which encases two parallel tubular holes capable of accepting the track shoe pin 60 and the sequent track shoe pin 60. The track shoe pin 60 is locked rigidly together with the end connector 26 by tightening the half-thread bolt 51 thought the tap hole 261 and a hole 266 in end connector 26 passing a notch 62. The thread part of the half-thread bolt 51 is tightened with tap hole 261 and the unthread part of the half-thread bolt 51 is attached with the hole 266 and the notch 62 on the track shoe pin 60. The underside of free end of the end connector 26 is cut open, thus forming a side flange which is extended to a grouser flange which is an angled paddle at the right-side and left-side and which can function as an oar for soft soil under snow, swamp mud, and desert condition, in cooperation with the rubber pad assembly 16 to increase the cruising performance of the vehicle more than twice in comparison to the traditional track shoe.

In addition, the track shoe assembly 6 according to the present specification is designed so as to minimize the amount of metal by incorporating parts with hollow characteristic while maintaining sufficient strength. As a consequence, the track shoe pin 60 and the end connector 26 have recesses 92, and it is possible on the extension guided chassis 9 assembly to adopt higher portion of rubber, such as largely rubber pad assembly 16, 21. These factors not only reduce manufacturing costs due to reduce usage of metal, but also reduce the total weight of the vehicle resulting in lighter vehicle and thus lower fuel consumption rate, rendering the use of vehicle 1 more economic.

Therefore, utilizing track shoe assembly for tracked vehicle 1, according to the present specification, will improve the mobility of the vehicle, increases its efficiency and make it suitable for operation or maneuvering under various terrain types, easier and more economical to use and maintain.

What is claimed is:

1. A track shoe assembly (6) comprising:
a number of track shoe members (7), and
a number of end connectors (26) configured to connect said track shoe members and extend from the sides of said track shoe members,
in which one of said track shoe members (7) comprises:
a pair of tubular housings (80) configured to house a respective track shoe pin (60),
a chassis (9) comprising a pair of tubular sleeves (94,95), a web-portion connecting said tubular sleeves, and a guide member (91) which is located on one of said tubular sleeves and has a shape tapering towards a top end of said chassis, wherein said tubular sleeves (94, 95) each hold a respective housing (80),
a pair of end members connected to said tubular housings to form a rectangular rigid chassis frame;
an end connector (26) having a pair of bush holes (267), each bush hole configured to receive a respective one of said track shoe pins (60) and thus connect adjacent track shoe members at either side of said track shoe members, and
a number of replaceable rubber pad bodies (9) configured to be mounted at the front side of a respective one of said track shoe members, said rubber pad bodies comprising:
a metal plate (13) comprising a double concave curve shape corresponding to the shape and size of said tubular housings (80), said metal plate (13) defining holes (132), and a rubber pad (16, 21), said rubber pad including rubber knots (162) extending through said holes defined in said metal plate.

2. The track shoe assembly of claim 1, in which said rubber pad (16) has a configuration of a dumbbell-like pattern comprising two lateral two-ended portions and a central portion, in which said two lateral portions are wider than said central portion.

3. The track shoe assembly of claim 1, in which said rubber pad (21) has a configuration of an X-shaped pattern comprising four portions extending from the center of said rubber pad (21) in a cross-like manner.

4. The track shoe assembly of claim 1, in which said rubber pad is positioned at a radial level that exceeds the radial level of said end connectors.

5. The track shoe assembly of claim 1, in which an end connector (26) comprises an extended flange grouser; said extended flange grouser comprising a cover extending around said pair of bush holes.

6. The track shoe assembly of claim 1, in which said metal plate of said rubber pad bodies comprise, in said double concave curve shape, rims spaced apart on the surface, and defines two square holes.

7. The track shoe assembly of claim 1, in which said metal plate (13) of said rubber pad body (9) further comprises a fastening bolt corresponding to a hole (93) defined in said web-portion of said track shoe member chassis (9) for mounting said rubber pad body at the front side of said respective track shoe member.

8. The track shoe assembly of claim 1, in which the guide member (91) of the chassis (9) defines a number of recesses (92) in a number of sides of said guide member.

9. The track shoe assembly of claim 1, in which said sleeves (94, 95) each hold a respective housing (80) at the center.

* * * * *